(12) United States Patent
Li et al.

(10) Patent No.: US 11,610,557 B2
(45) Date of Patent: Mar. 21, 2023

(54) METHOD AND APPARATUS FOR IMPROVING A HALO, AND DISPLAY

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Ruilian Li, Beijing (CN); Xueqin Wei, Beijing (CN); Lixin Zhu, Beijing (CN); Lei Shi, Beijing (CN); Chunyang Nie, Beijing (CN); Ke Dai, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 355 days.

(21) Appl. No.: 17/051,726

(22) PCT Filed: Oct. 15, 2019

(86) PCT No.: PCT/CN2019/111305
§ 371 (c)(1),
(2) Date: Oct. 29, 2020

(87) PCT Pub. No.: WO2021/072652
PCT Pub. Date: Apr. 22, 2021

(65) Prior Publication Data
US 2022/0319448 A1 Oct. 6, 2022

(51) Int. Cl.
*G09G 3/34* (2006.01)

(52) U.S. Cl.
CPC ..... *G09G 3/3406* (2013.01); *G09G 2360/148* (2013.01); *G09G 2360/16* (2013.01)

(58) Field of Classification Search
CPC .......... G09G 2300/023; G09G 3/3406; G09G 3/3426; G02F 1/1347
See application file for complete search history.

(56) References Cited

U.S. PATENT DOCUMENTS 8,760,385 B2 * 6/2014 Kwon .................. G09G 3/3426
345/102
9,990,890 B2 * 6/2018 Kawai .................. G09G 3/3426
(Continued)

FOREIGN PATENT DOCUMENTS

CN         203643726 U    6/2014
CN         104820294 A    8/2015
(Continued)

*Primary Examiner* — Koosha Sharifi-Tafreshi
(74) *Attorney, Agent, or Firm* — Procopio, Cory, Hargreaves & Savitch LLP

(57) ABSTRACT

A method for improving a halo is applied to a display panel. The display panel includes a dimming sub-panel and a display sub-panel that are superposed. The dimming sub-panel includes a plurality of first pixels, the display sub-panel includes a plurality of second pixels, and each first pixel corresponds to at least two second pixels. The method for improving the halo includes: as for the first pixel: acquiring a second brightness datum of each of the at least two second pixels corresponding to the first pixel; calculating a target brightness datum of the first pixel according to second brightness data of the at least two second pixels; determining a first gray-scale datum of the first pixel according to the target brightness datum.

17 Claims, 6 Drawing Sheets

(56) References Cited

U.S. PATENT DOCUMENTS

| | | |
|---|---|---|
| 2007/0188676 A1 | 8/2007 | Choi et al. |
| 2016/0178892 A1 | 6/2016 | De Greef |
| 2017/0082882 A1 | 3/2017 | Hirakata et al. |
| 2020/0292894 A1 | 9/2020 | Liu et al. |

FOREIGN PATENT DOCUMENTS

| | | |
|---|---|---|
| CN | 105976746 A | 9/2016 |
| CN | 107833560 A | 3/2018 |
| CN | 108646473 A | 10/2018 |
| CN | 108962159 A | 12/2018 |
| CN | 108962179 A | 12/2018 |
| CN | 108983463 A | 12/2018 |
| CN | 109343276 A | 2/2019 |
| JP | 2017059239 A | 3/2017 |

\* cited by examiner

METHOD AND APPARATUS FOR IMPROVING A HALO, AND DISPLAY

CROSS-REFERENCE TO RELATED APPLICATIONS

This application is a national phase entry under 35 USC 371 of International Patent Application No, PCT/CN2019/111305 filed on Oct. 15, 2019, which is incorporated herein by reference in its entirety.

TECHNICAL FIELD

The present disclosure relates to the field of display technologies, and in particular, to a method and an apparatus for improving a halo, and a display.

BACKGROUND

A dual cell includes a main cell (also referred to as a display sub-panel) and a sub-cell (also referred to as a dimming sub-panel) that are arranged in a stack. A display apparatus including the dual cell has an ultra-high contrast (greater than 40000:1) and a color depth of up to 16 bits, and can achieve million-level regional dimming,

SUMMARY

In one aspect, a method for improving a halo is provided. The method for improving the halo is applied to a display panel. The display panel includes a dimming sub-panel and a display sub-panel that are superposed, the dimming sub-panel includes a plurality of first pixels, the display sub-panel includes a plurality of second pixels, and each first pixel corresponds to at least two second pixels. The method for improving the halo includes: as for the first pixel: acquiring a second brightness datum of each of the at least two second pixels corresponding to the first pixel; calculating a target brightness datum of the first pixel according to second brightness data of the at least two second pixels; and determining a first gray-scale datum of the first pixel according to the target brightness datum.

In some embodiments, calculating the target brightness datum of the first pixel according to the second brightness data of the at least two second pixels includes: acquiring a brightness coefficient of each of the at least two second pixels, the brightness coefficient being a ratio of an overlapping area of the second pixel and the first pixel to an area of the first pixel; obtaining a proportional brightness datum of each of the at least two second pixels by multiplying the brightness coefficient of the second pixel in the at least two second pixels by the second brightness datum of the second pixel; and obtaining the target brightness datum of the first pixel by summing the proportional brightness datum of each of the at least two second pixels.

In some embodiments, if an overlapping area of one of the at least two second pixels and the first pixel is less than a first threshold, a brightness coefficient of the second pixel is 0.

In some embodiments, the first threshold is any value between 1% and 10% of a pixel area of the one of the at least two second pixels.

In some embodiments, if the overlapping area of one of the at least two second pixels and the first pixel is greater than a second threshold, a brightness coefficient of the second pixel is a ratio of a whole area of the second pixel to an area of the first pixel.

In some embodiments, the second threshold is any value between 90% and 99% of a pixel area of the one of the at least two second pixels.

In some embodiments, the brightness coefficient of each of he at least two second pixels is a datum pre-stored in the display panel.

In some embodiments, acquiring the second brightness datum of each of the at least two second pixels corresponding to the first pixel includes: acquiring a second gray-scale datum of the second pixel in the at least two second pixels corresponding to the first pixel; and acquiring the second brightness datum of the second pixel corresponding to the second gray-scale datum of the second pixel according to a correspondence between second gray-scale data and second brightness data of the display sub-panel.

In some embodiments, the correspondence between the second gray-scale date and the second brightness data of the display sub-panel is data pre-stored in the display panel.

In some embodiments, determining the first gray-scale datum of the first pixel according to the target brightness datum includes: determining a first brightness datum that has a minimum absolute value of a difference with the target brightness datum of the first pixel among a plurality of first brightness data of the first pixel; and acquiring a first gray-scale datum corresponding to the first brightness datum according to a correspondence between first gray-scale data and first brightness data of the dimming sub-panel, the first gray-scale datum being used as the first gray-scale datum of the first pixel.

In some embodiments, if there are two first brightness data that have the minimum absolute value of the difference with the target brightness datum of the first pixel among the plurality of first brightness data of the first pixel, one first brightness datum is selected from the two first brightness data.

In some embodiments, selecting the one first brightness datum from the two first brightness data includes: selecting a larger first brightness datum from the two first brightness data; or selecting a smaller first brightness datum from the two first brightness data.

In some embodiments, the correspondence between the first gray-scale data and the first brightness data of the dimming sub-panel is data pre-stored in the display panel.

In another aspect, an apparatus for improving a halo is provided. The apparatus for improving the halo includes a processor and a memory. The memory stores computer program instructions adapted to be executed by the processor, and when the computer program instructions run on the processor, one or more steps of the method for improving the halo as described in any of the above embodiments are performed.

In some embodiments, the memory further stores at least one of a brightness coefficient datum of each of the at least two second pixels corresponding to each first pixel, data of correspondence between second gray-scale data and second brightness data of the display sub-panel, and data of correspondence between first gray-scale data and first brightness data of the dimming sub-panel.

In yet another aspect, a display is provided. The display includes a display panel and the apparatus for improving the halo that is electrically connected to the display panel. The apparatus for improving halo is the apparatus for improving halo as described in the above embodiments.

In yet another aspect, an apparatus for improving a halo is provided. The apparatus for improving the halo is applied to a display panel. The display panel includes a dimming sub-panel and a display sub-panel that are superposed. The dimming sub-panel includes a plurality of first pixels, the display sub-panel includes a plurality of second pixels, and each first pixel corresponds to at least two second pixels. The apparatus for improving the halo includes an acquisition module, a calculation module and a determination module. The acquisition module is configured to acquire a second brightness datum of each of the at least two second pixels corresponding to the first pixel. The calculation module is configured to calculate a target brightness datum of the first pixel according to the, second brightness datum acquired by the acquisition module. The determination module is configured to determine a first gray-scale datum of the first pixel according to the target brightness datum of the first pixel calculated by the calculation module.

In yet another aspect, a non-transitory computer-readable storage medium is provided. The non-transitory computer-readable storage medium stores computer program instructions that, when run on a processor, cause the processor to perform one or more steps of the method for improving the halo as described in any of the above embodiments.

In yet another aspect, a computer program product is provided. The computer program product includes computer program instructions that, when executed on a computer, cause the computer to perform one or more steps of the method for improving halo as described in any of the above embodiments.

In yet another aspect, a computer program is provided. When executed on a computer, the computer program causes the computer to perform one or more steps of the method for improving halo as described in any of the above embodiments.

BRIEF DESCRIPTION OF THE DRAWINGS

In order to describe technical solutions n the present disclosure more clearly, the accompanying drawings to be used in the description of the present disclosure will be introduced briefly. Obviously, the accompanying drawings to be described below are merely some embodiments of the present disclosure, and a person of ordinary skill in the, art can obtain other drawings according to these drawings without paying any creative effort.

DETAILED DESCRIPTION

Technical solutions in some embodiments of the present disclosure will be described clearly and completely with reference to the accompanying drawings. Obviously, the described embodiments are merely some but not all embodiments of the present disclosure. All other embodiments obtained on the basis of the embodiments of the present disclosure by a person of ordinary skill in the art shall be included in the protection scope of the present disclosure.

Figure 1:
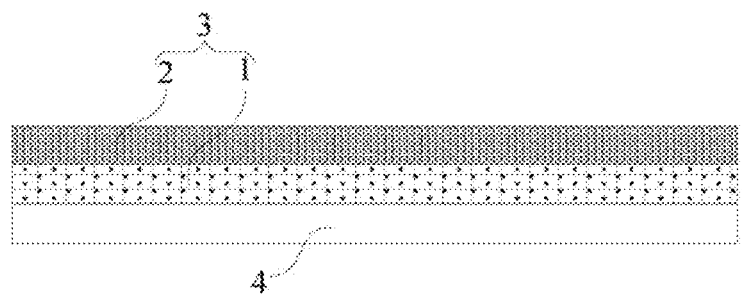
FIG. 1 is a schematic structural diagram of a dual cell, in accordance with some embodiments.
Figure 2A:
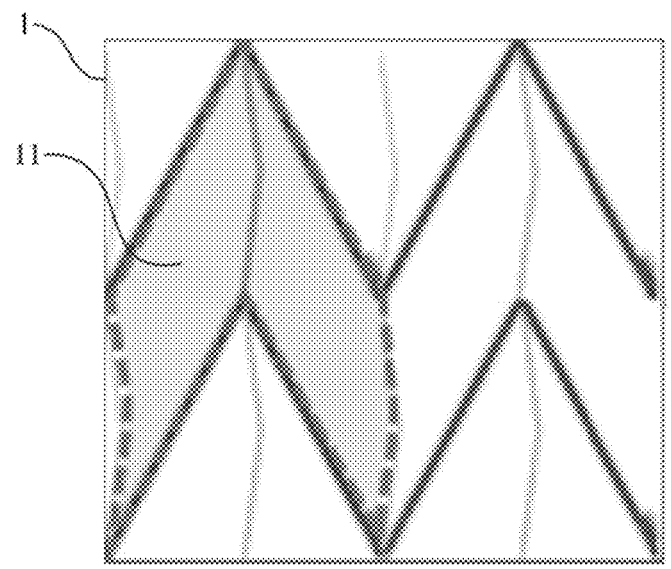
FIG. 2A is a schematic diagram of a pixel structure of dimming sub-panel, in accordance with some embodiments.
Figure 2B:
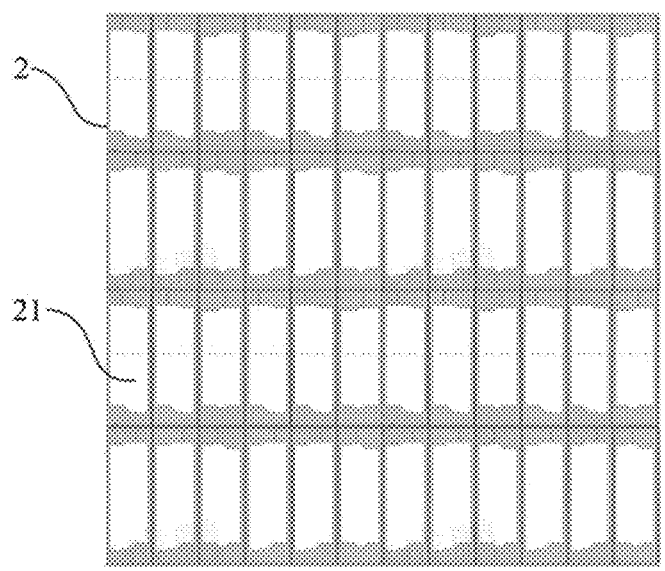
FIG. 2B is a schematic diagram of a pixel structure of a display sub-panel, in accordance with some embodiments.
Figure 3A:
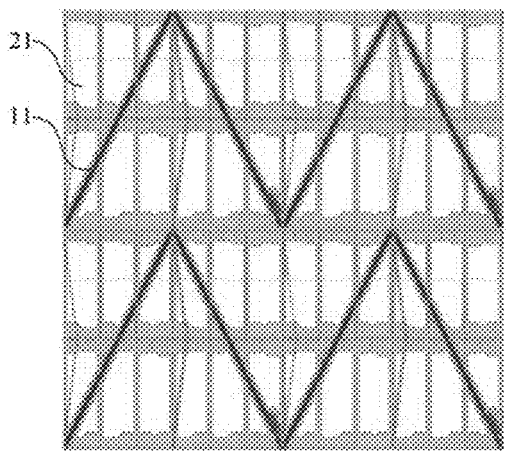
FIG. 3A is a schematic diagram of a pixel structure after a dimming sub-panel and a display sub-panel are superposed, in accordance with some embodiments.

A dual cell is a display panel with ultra-high contrast. As shown in FIG. 1, a dual-cell display panel 3 includes a display sub-panel 2 and a dimming sub-panel 1 that are superposed. A backlight module 4 is used to provide light required for image display for the display panel 3. The backlight module 4 is disposed on a side of the dimming sub-panel 1 of the display panel 3 away from the display sub-panel 2. As shown in FIGS. 2A and 2B, the dimming sub-panel 1 includes a plurality of first pixels 11, and the display sub-panel 2 includes a plurality of second pixels 21. As shown in FIG. 3A, each first pixel 11 corresponds to multiple second pixels 21. Herein, that each first pixel 11 corresponds to the multiple second pixels 21 means that, an orthographic projection of each first pixel 11 on the display sub-panel 2 covers a whole region or a partial region of each of the multiple second pixels 21 on the display sub-panel 2, and a relationship between the first pixel 11 and the multiple second pixels covered by the orthographic projection of the first pixel 11 is referred to as "correspondence".

It will be noted that, as shown in FIG. 3A, in some examples, the multiple second pixels 21 corresponding to the first pixel 11 may include at least one second pixel 21, a whole region of which is completely covered by the orthographic projection of the first pixel 11 on the display sub-panel 2, or may include at least one second pixel 21, a partial region of which is covered by the orthographic projection of the first pixel 11 on the display sub-panel 2. The partial region of each of the at least one second pixel 21 is, for example, one half, one third, or the like of the second pixel 21.

As for the dual-cell display panel 3, backlight emitted by the backlight module 4 passes through the first pixel 11 of the dimming sub-panel 1, and then passes through the multiple second pixels 21 corresponding to the first pixel 11. By adjusting gray scales of first pixels 11 in the dimming sub-panel 1 separately, it is possible to control brightness of backlight allowed to be transmitted by the first pixels 11, thereby supplying the backlight with different brightness to different regions of the display sub-panel 2, and making the display panel 3 show a high contrast and dark field details.

Since each first pixel 11 in the dimming sub-panel corresponds to multiple second pixels 21 in the display sub-panel 2, and each of the multiple second pixels 21 has a different gray scale, the brightness of the first pixel 11 in the dimming sub-panel 1 cannot be the same as brightness of each of the multiple second pixels 21 corresponding thereto.

When the brightness of the first pixel 11 s greater than the brightness of one or some of the multiple second pixels 21 corresponding thereto, the brightness of these second pixels 21 will be too bright. When the brightness of the first pixel 11 is less than the brightness of one or some of the multiple second pixels 21 corresponding thereto, the brightness of these second pixels 21 will be too dark. As a result, there is a virtual image in an image displayed on the display panel 3, thereby causing a halo phenomenon of the display panel 3, and resulting in a decrease in display quality.

In the related art, in order to improve the halo phenomenon of the display panel 3, a gray-scale datum of each of the multiple second pixels 21 corresponding to the first pixel 11 is obtained first, and then a maximum gray-scale datum among gray-scale data of the multiple second pixels 21 is used as a gray-scale datum of the first pixel 11 corresponding to the multiple second pixels 21. In this way, the gray-scale datum of the first pixel 11 is equal to the maximum gray-scale datum among the gray-scale data of the multiple second pixels 21 corresponding thereto, so that a problem that the brightness of the second pixels 21 in the display sub-panel 2 is too dark is avoided, and the halo phenomenon of the display panel 3 is improved to a certain extent.

Figure 3B:
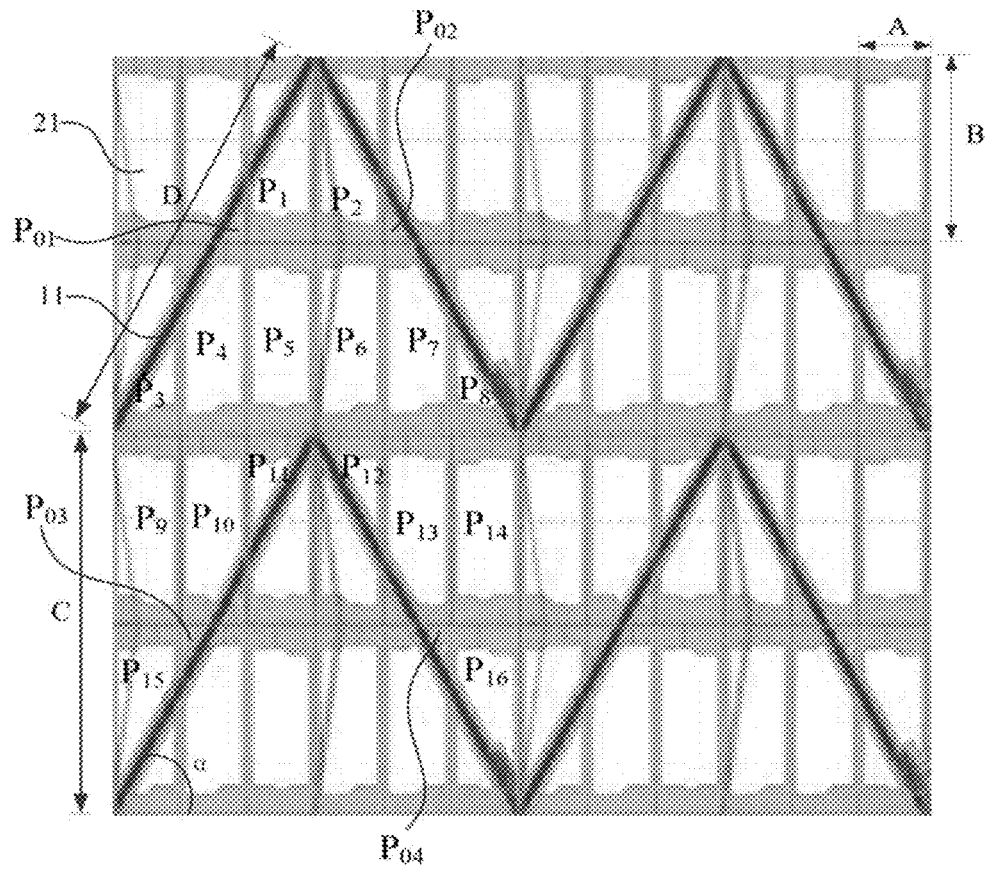
FIG. 3B is a schematic diagram of another pixel structure after a dimming sub-panel and a display sub-panel are superposed, in accordance with some embodiments.
Figure 3C:
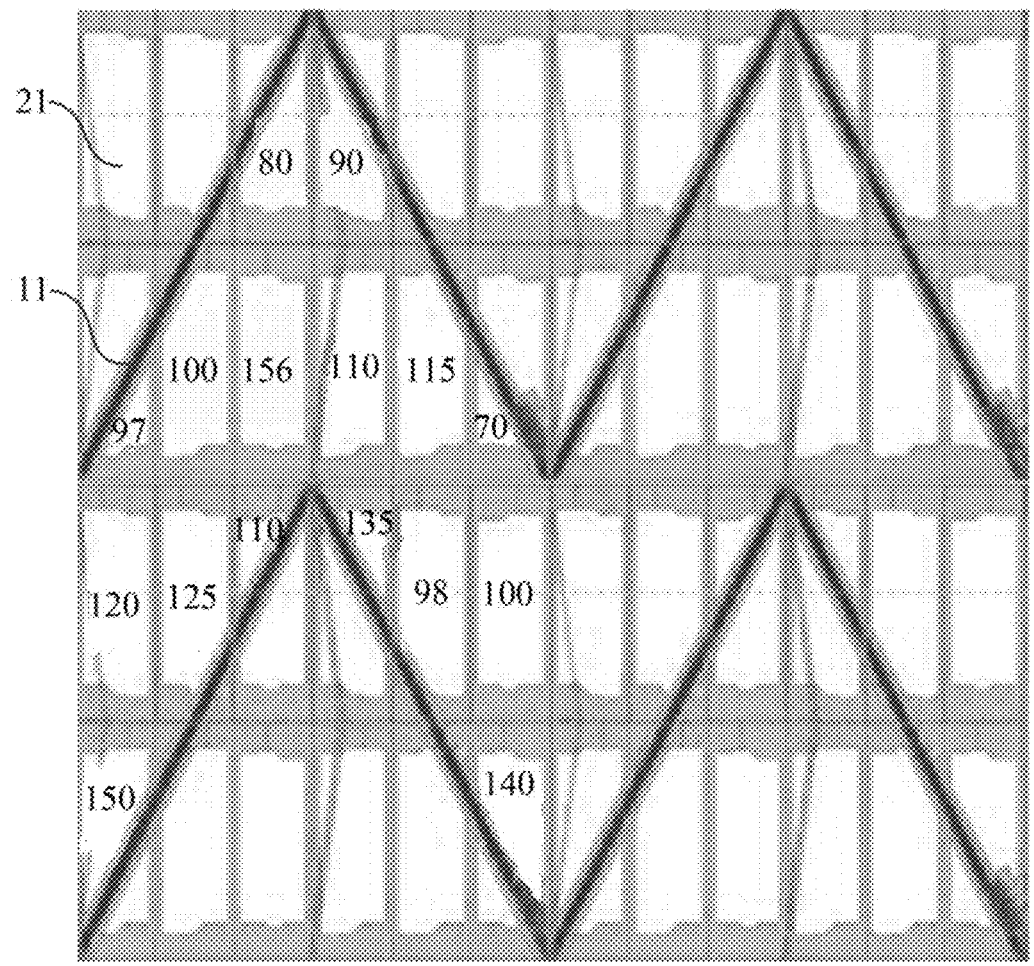
FIG. 3C is a schematic diagram of yet another pixel structure after a dimming sub-panel and a display sub-panel are superposed, in accordance with some embodiments.
Figure 3D:
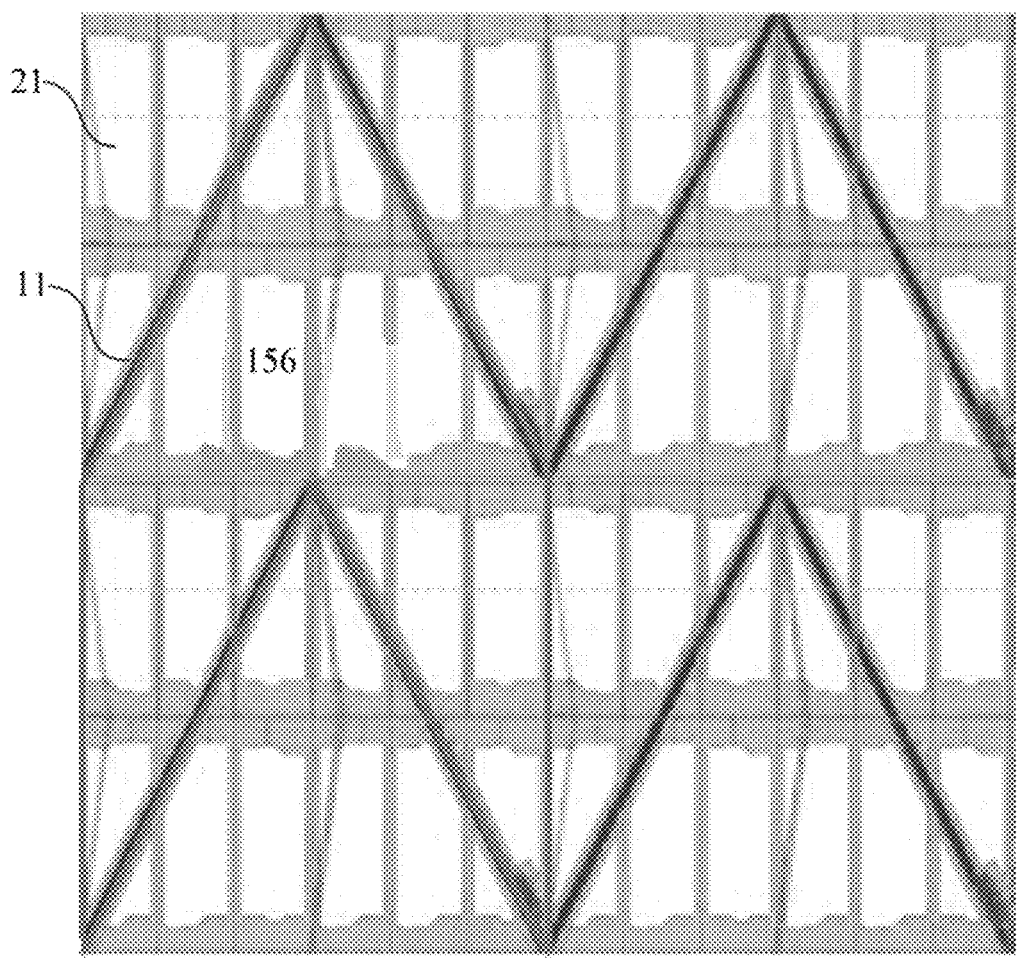
FIG. 3D is a schematic diagram of yet another pixel structure after a dimming sub-panel and a display sub-panel are superposed, in accordance with some embodiments.

For example, as shown in FIGS. 3B and 3C, the number of the multiple second pixels 21 in the display sub-panel 2 corresponding to one first pixel 11 in the dimming sub-panel 1 is twenty, and the twenty second pixels 21 are $P_{01}$, $P_{02}$, $P_{03}$, $P_{04}$, $P_1$, $P_2$, . . . , $P_{15}$ and $P_{16}$. Overlapping areas of orthographic projections of the second pixels $P_{01}$, $P_{02}$, $P_{03}$, and $P_{04}$ and an orthographic projection of the first pixel 11 on the display sub-panel 2 are too small to be considered. The gray-scale data of remaining sixteen second pixels 21 (I.e., $P_1$ to $P_{16}$) are 80, 90, 97, 100, 156, 110, 115, 70 120, 125, 110, 135, 98, 100, 150, and 140. Among the sixteen gray-scale data, the maximum gray-scale datum is 156. As shown in FIG. 3D, the gray-scale datum of the first pixel 11 corresponding to the sixteen second pixels 21 is thus determined to be 156.

The problem that the brightness of the second pixels 21 in the display sub-panel 2 is too dark may be avoided in the above examples. However, the gray-scale datum of the first pixel 11 is the same as the maximum gray-scale datum among the gray-scale data of the multiple second pixels 21 corresponding thereto. From another perspective a difference between the gray-scale datum of the first pixel 11 and the minimum gray-scale datum among the gray-scale data of the multiple second pixels 21 corresponding thereto is increased. As a result, the brightness of a part of the multiple second pixels 21 corresponding to the first pixel 11 in the display sub-panel 2 is too bright. Moreover, in a same display panel 3, although the gray-scale datum of the second pixel 21 is the same as the gray-scale datum of the first pixel 11, brightness corresponding to the second pixel 21 may not be the same as brightness corresponding to the first pixel 11. Therefore, by using the technical solution that the gray-scale datum of the first pixel 11 is equal to the maximum gray-scale datum among the gray-scale data of the multiple second pixels 21 corresponding thereto, although it is possible to improve the halo phenomenon of the display panel 3 to a certain extent, an improvement effect on the halo is not desirable.

Figure 4:
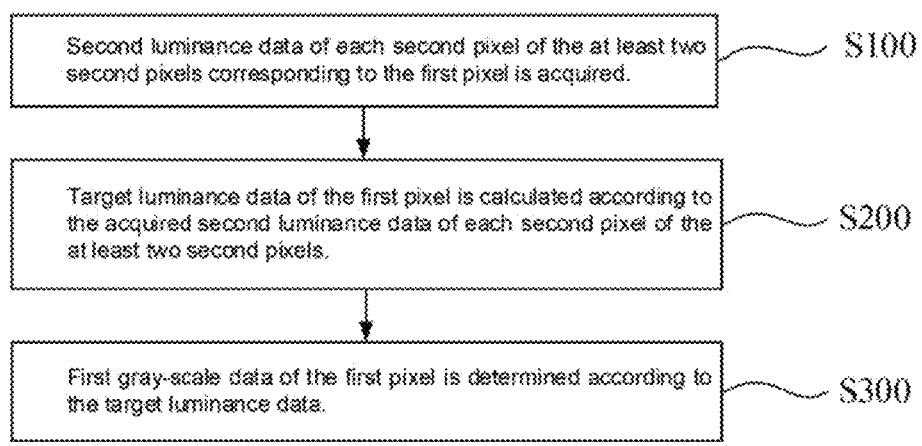
FIG. 4 is a flow diagram of a method for improving a halo, in accordance with some embodiments.

In this regard, some embodiments of the present disclosure provide a method for improving a halo. Referring to FIGS. 1, 2A and 2B, the method for improving the halo is applied to the display panel 3. The display panel 3 is a dual cell, and includes the dimming sub-panel 1 and the display sub-panel 2 that are arranged in a superposed manner. The dimming sub-panel 1 includes a plurality of first pixels 21, and the display sub-panel 2 includes a plurality of second pixels 21. Each first pixel 11 corresponds to at least two second pixels 21. As shown in FIG. 4, the method for improving the halo includes step 100 to step 300 (S100 to S300).

In S100, a second brightness datum of each of the at least two second pixels 21 corresponding to the first pixel 11 is acquired.

In S200, a target brightness datum, of the first pixel 11 is calculated according to the acquired second brightness datum of each of the at least two second pixels 21.

In S300, a first gray-scale datum of the first pixel 11 is determined according to the target brightness datum.

It will be noted that S100 to S300 are described only for one first pixel 11, and as for the other first pixels 11, the working principle of the method for improving the halo is the same and will not be described herein again.

Herein, the first gray-scale datum is a datum that is used to drive the first pixel 11 n the dimming sub-panel 1 to display a gray scale, and a different first gray-scale datum is used to drive the first pixel 11 in the dimming sub-panel 1 to display a different gray scale. For example, the first gray-scale datum may be a voltage value or a current value that is used to drive the first pixel 11 in the dimming sub-panel 1 to display a different gray scale. The first brightness datum to be referred to hereinafter is the brightness of the first pixel 11 when the first pixel 11 displays the first gray scale.

The second gray-scale datum to be referred to hereinafter is a datum that is used to drive the second pixel 21 in the display sub-panel 2 to display a gray scale, and a different second gray-scale datum is used to drive the second pixel 21 in the display sub-panel 2 to display a different gray scale. For example, the second gray-scale datum may be a voltage value or a current value that is used to drive the second pixel 21 in the display sub-panel 2 to display a different gray scale. Similarly, a second brightness datum is brightness of the second pixel 21 when the second pixel 21 displays the second gray scale.

In some examples, the target brightness datum is a brightness datum that is calculated according to the second brightness datum of each of the at least two second pixels 21 corresponding to the first pixel 11 and a brightness coefficient corresponding to the second pixel 21. A brightness coefficient is a ratio of an overlapping area of each second pixel 21 and a corresponding first pixel 11 to an area of the first pixel 11. In a case where the area of the first pixel 11 is unchanged, the larger the overlapping area of each second pixel 21 and the first pixel 11, the larger the brightness coefficient of the second pixel 21, the larger of a ratio of a second brightness datum to the target brightness datum, and the closer the target brightness datum will be to the second brightness datum.

For example, the first pixel 11 corresponds to six second pixels 21, and second brightness data of the six second pixels 21 are 100, 156, 110, 115, 80 and 114. The target brightness datum that is calculated according to the second brightness data of the six second pixels 21 and brightness coefficients corresponding to respective second pixels 21 is 113 (a specific calculation method can be referred to a calculation process of the target brightness datum to be mentioned hereinafter), in this way, the target brightness datum that is calculated according to the second brightness datum of each second pixel 21 and the corresponding brightness coefficient is not much different from the second brightness datum of each second pixel 21, so that the brightness of the six second pixels 21 corresponding to the first pixel 11 may be reflected as a whole or approximately as a whole.

Based on this, in the above embodiments of the present disclosure, the target brightness datum of the first pixel 11 that is close to the second brightness datum of each of the at least two second pixels 21 corresponding to the first pixel 11 is calculated first, and then the first gray-scale datum of the first pixel 11 is determined according to the target brightness datum of the first pixel 11. In this way, when the first gray-scale datum is used to drive the first pixel 11 to display a first gray scale, and each second gray-scale data is used to drive a corresponding one of the at least two second pixels 21 corresponding to the first pixel 11 to display the second gray scale, the target brightness datum corresponding to the first gray scale is relatively close to the second brightness datum corresponding to the second gray-scale data as a whole. Therefore, the brightness of the first pixel 11 in the dimming sub-panel 1 is approximately the same as the brightness of the at least two second pixels 21 corresponding thereto, so that a situation that the brightness of the second pixels 21 in the display sub-panel 2 is too dark or too bright is improved, and a purpose of improving the halo of the display panel 3 is achieved.

Figure 5:
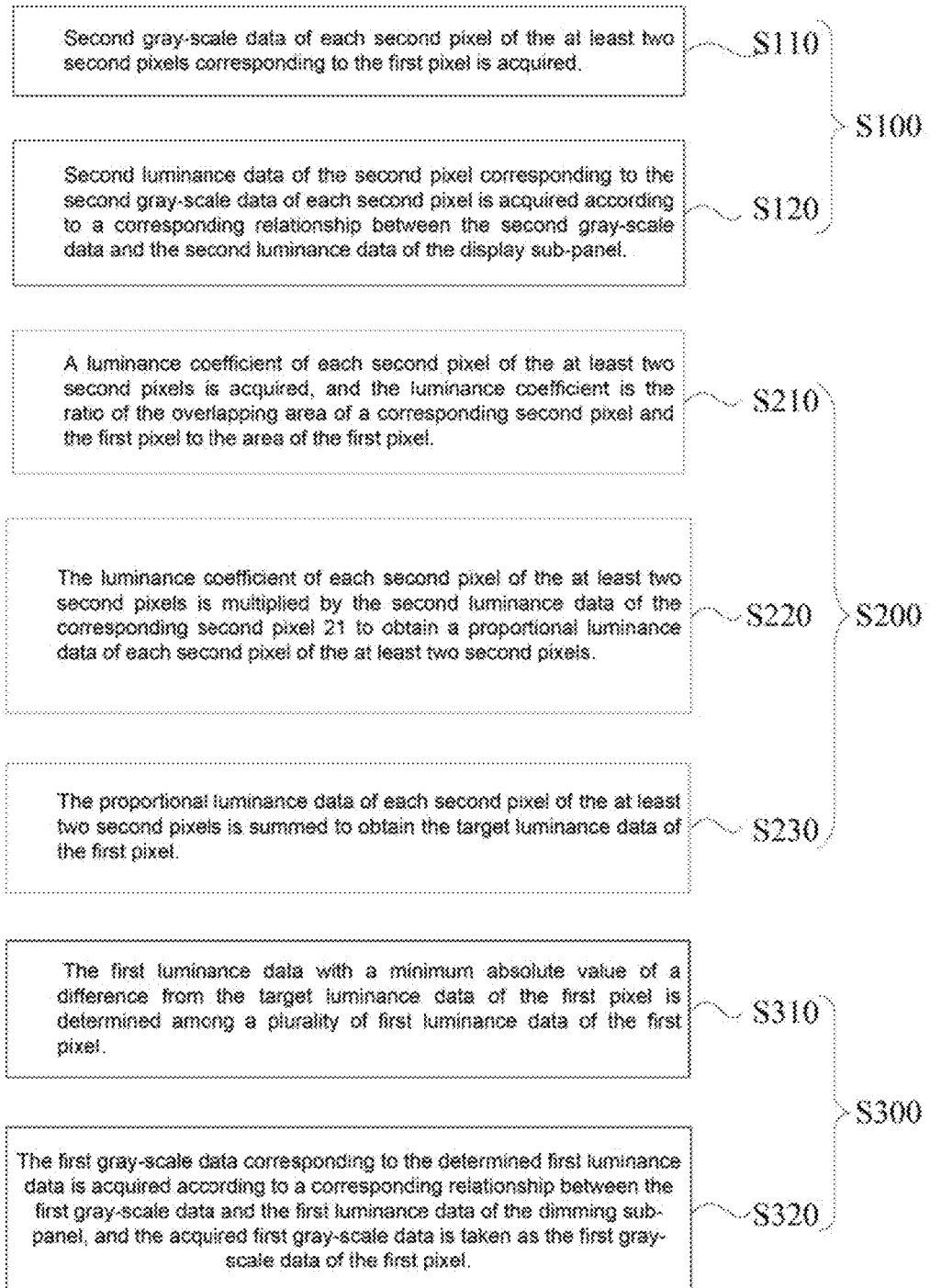
FIG. 5 is a flow diagram of another method for improving a halo, in accordance with some embodiments.

In some embodiments, as shown in FIG. 5, the step of acquiring the second brightness datum of each of the at least two second pixels 21 corresponding to the first pixel 11 (i.e., S100) includes; step 110 (S110) and step 120 (S120).

In S110, a second gray-scale datum of each of the at least two second pixels 21 corresponding to the first pixel 11 is acquired.

In S120, the second brightness datum of the second pixel 21 corresponding to the second gray-scale datum of the second pixel 21 is acquired according to a correspondence between second gray-scale data and second brightness data of the display sub-panel 2.

Herein, the correspondence between the second gray-scale data and the second brightness data corresponding to the second gray-scale data of the display sub-panel 2 may be measured to obtain a Gamma curve of the display sub-panel 2.

For example, assuming that the number of gray scales that the display sub-panel 2 may display is 256, the correspondence between the second gray-scale data and the second brightness data of the display sub-panel 2 may be as shown in Table 1.

TABLE 1

|  | Second gray-scale datum | | | | | | |
| --- | --- | --- | --- | --- | --- | --- | --- |
|  | 0 | 1 | 2 | 3 | 4 | ... | 254 | 255 |
| Second brightness datum | 0.26 | 0.36 | 0.42 | 0.48 | 0.54 | ... | 264.3 | 264.9 |

In some embodiments, the correspondence between the second gray-scale data and the second brightness data of the display sub-panel 2 is data pre-stored in the display panel 3. In this way, in a process of performing S110 and S120, the pre-stored data of the correspondence between the second gray-scale data and the second brightness data can be directly invoked, and then the second brightness datum corresponding to the second gray-scale datum of each second pixel 21 is acquired according to the second gray-scale datum of the second pixel 21, so as to increase a processing speed of the display device.

In some embodiments of the present disclosure, as shown in FIG. 5, the step of calculating the target brightness datum of the first pixel 11 according to the acquired second brightness datum of each of the at least two second pixels 21 (i.e., S200) includes: step 210 (S210) to step 230 (S230).

In S210, a brightness coefficient of each of the at least two second pixels 21 is acquired, and the brightness coefficient is a ratio of an overlapping area of the second pixel 21 and the first pixel 11 to the area of the first pixel 11.

Herein, the area of the first pixel 11 is an area of the orthographic projection of the first pixel 11 on the display sub-panel 2. The overlapping area of the second pixel 21 and the first pixel 11 is an overlapping area of the orthographic projections of the second pixel 21 and the first pixel 11 on the display sub-panel 2.

For example, as shown in FIG. 38, according to a pattern of the orthographic projection of the first pixel 11 on the display sub-panel 2, geometric data of the pattern is measured. The geometric data includes, for example, a side length, an included angle between two adjacent sides, an arc length, a radius or the like of the pattern. An area X of the pattern is calculated according to the measured geometric data of the pattern, and the area X is the area of the first pixel 11. Then overlapping areas $Y_1, Y_2, Y_3 \ldots$ and $Y_i$ of the first pixel 11 and respective second pixels 21 of the at least two second pixels 21 corresponding to the first pixel 11 are sequentially calculated. In this way, the brightness coefficients of the respective second pixels 21 can be calculated, and the brightness coefficients of the respective second pixels 21 of the at least two second pixels 21 corresponding to the first pixel 11 are $$\frac{Y_1}{X}, \frac{Y_2}{X}, \frac{Y_3}{X}, \ldots, \text{and } \frac{Y_i}{X}.$$

In some embodiments, the brightness coefficient of each of the at least two second pixels 21 corresponding to the first pixel 11 is a datum pre-stored in the display panel, so that the pre-stored brightness coefficient datum can be directly invoked in the subsequent steps, which is beneficial to increasing the processing speed of the display device.

In S220, the brightness coefficient of each of the at least two second pixels 21 is multiplied by the second brightness datum of the second pixel 21 to obtain a proportional brightness datum of each of the at least two second pixels 21.

In S220, according to the second brightness datum of each of the at least two second pixels 21 corresponding to the first pixel 11 acquired in the above embodiments (for example, the second brightness data of the at least two second pixels 21 are $L_1, L_2, L_3, \ldots,$ and $L_i$), and the brightness coefficient of the second pixel 21 of the at least two second pixels 21, the proportional brightness data of the at least two second pixels 21 are calculated, being $$\frac{Y_1 L_1}{X}, \frac{Y_2 L_2}{X}, \frac{Y_3 L_3}{X}, \ldots, \text{and } \frac{Y_i L_i}{X}.$$

In S230, the proportional brightness data of the respective second pixels 21 of the at least two second pixels 21 are summed to obtain the target brightness data of the first pixel 11

In S230, for example, the target brightness datum of the first pixel 11 is $$L_{sub} = \frac{Y_1 L_1}{X} + \frac{Y_2 L_2}{X} + \frac{Y_3 L_3}{X} + \ldots + \frac{Y_i L_i}{X}.$$

It will be understood that the larger the overlapping area of one second pixel 21 and the first pixel 11, the higher the brightness of the second pixel 21 that needs to be contributed by the first pixel 11; and the smaller the overlapping area of one second pixel 21 and the first pixel 11, the lower the brightness of the second pixel 21 that needs to be contributed by the first pixel 11. Therefore, in the embodiments of the present disclosure, the ratio of the overlapping area of each of the at least two second pixels 21 and the first pixel 11 to the area of the first pixel 11 is used as the brightness coefficient, and the target brightness datum of the first pixel 11 is calculated according to these brightness coefficients, so that the target brightness datum of the first pixel 11 in the dimming sub-panel 1 is approximately the same as or close to the second brightness data of the multiple second pixels 21 corresponding to the first pixel 11 in the display sub-panel 2, which improves the situation that the brightness of the second pixel 21 in the display sub-panel 2 is too dark or too bright, and achieves the purpose of improving the halo of the display panel 3.

For example, as shown in FIG. 3B, each second pixel 21 in the display sub-panel 2 is in a shape of a rectangle. A length of the second pixel 21 is B, a width of the second pixel 21 is A, and then an area of the second pixel 21 is $S_1 = AB$.

A shape of each first pixel 11 in the dimming sub-panel 1 is formed by splicing two parallelograms, and an area of the first pixel 11 can be regarded as a sum of areas of two symmetrical parallelograms. Lengths of two adjacent sides of each parallelogram are C and D, respectively, and a complementary angle of an included angle between the two adjacent sides is $\alpha$. In this way, an area of a parallelogram is obtained: $S_2 = CD \cos \alpha$. That is, an area of each first pixel 11 is $S_3 = 2CD \cos \alpha$.

The number of second pixels 21 in the display sub-panel 2 corresponding to one first pixel 11 in the dimming sub-panel 1 is twenty, and the twenty second pixels are $P_{01}$, $P_{02}$, $P_{03}$, $P_{04}$, $P_1$, $P_2$, ..., $P_{15}$ and $P_{16}$.

An overlapping region of the second pixel $P_{01}$ and the first pixel 11 is in a shape of a right triangle. Assuming that lengths of two right-angled sides of the right triangle are ½A and ⅓B respectively, the overlapping area of the second pixel $P_{01}$ and the first pixel 11 is $$\frac{1}{12}AB.$$

Since the shape of the first pixel 11 is formed by splicing two parallelograms. Assuming that each parallelogram is a centrosymmetric figure, the overlapping area of each of the second pixels $P_{01}$, $P_{02}$, $P_{03}$ and $P_{04}$ and the first pixel 11 is equal, all being $$\frac{1}{12}AB,$$

that is, $$S_4 = S_{P01} = S_{P02} = S_{P03} = S_{P04} = \frac{1}{2}\left(\frac{1}{2}A\right)\left(\frac{1}{3}B\right) = \frac{1}{12}AB. \quad (1)$$

The overlapping area of each of the second pixels $P_1$, $P_2$, $P_{15}$ and $P_{16}$ and the first pixel 11 is:

$$S_5 = S_{P1} = S_{P2} = S_{P15} = S_{P16} = \frac{1}{2}A\left(\frac{1}{3}B + B\right) = \frac{2}{3}AB. \quad (2)$$

The overlapping area of each of the second pixels $P_3$, $P_8$, $P_{11}$ and $P_{12}$ and the first pixel 11 is:

$$S_6 = S_{P3} = S_{P8} = S_{P11} = S_{P12} = \frac{1}{2}A\left(\frac{2}{3}B\right) = \frac{1}{3}AB. \quad (3)$$

The overlapping area of each of the second pixels $P_4$, $P_7$, $P_{10}$ and $P_{13}$ and the first pixel 11 is:

$$S_7 = S_{P4} = S_{P7} = S_{P10} = S_{P13} = AB - \frac{1}{2}\left(\frac{1}{2}A\right)\left(\frac{1}{3}B\right) = \frac{11}{12}AB. \quad (4)$$

The overlapping area of each of the second pixels $P_5$, $P_6$, $P_9$ and $P_{14}$ and the first pixel 11 is:

$$S_8 = S_{P5} = S_{P6} = S_{P9} = S_{P14} = AB \quad (5)$$

According to the formulas (1) to (5), the overlapping area of the first pixel 11 and each of the twenty second pixels $P_{01}$, $P_{02}$, $P_{03}$, $P_{04}$, $P_1$, $P_2$, ..., $P_{15}$ and $P_{16}$ corresponding to the first pixel 11 is calculated, and then the brightness coefficient of each of the twenty second pixels is calculated.

The brightness coefficients of the second pixels $P_{01}$, $P_{02}$, $P_{03}$ and $P_{04}$ are equal, all being:

$$\frac{S_4}{S_3} = \frac{AB}{24CD\cos\alpha}.$$

The brightness coefficients of the second pixels $P_1$, $P_2$, $P_{15}$ and $P_{16}$ are equal, all being:

$$\frac{S_5}{S_3} = \frac{AB}{3CD\cos\alpha}.$$

The brightness coefficients of he second pixels $P_3$, $P_8$, $P_{11}$ and $P_{12}$ are equal, all being:

$$\frac{S_6}{S_3} = \frac{AB}{6CD\cos\alpha}.$$

The brightness coefficients of the second pixels $P_4$, $P_7$, $P_{10}$ and $P_{13}$ are equal, all being:

$$\frac{S_7}{S_3} = \frac{11AB}{24CD\cos\alpha}.$$

The brightness coefficients of the second pixels $P_5$, $P_6$, $P_9$ and $P_{14}$ are equal, all being:

$$\frac{S_8}{S_3} = \frac{AB}{2CD\cos\alpha}.$$

According to the brightness coefficients of the twenty second pixels corresponding to the first pixel 11 and the second brightness data $L_{01}$, $L_{02}$, $L_{03}$, ..., $L_{16}$ of the twenty second pixels, the target brightness of the first pixel 11 can be calculated, being:

$$L_{sub} = \frac{AB(L_{01} + L_{02} + L_{03} + L_{04})}{24CD\cos\alpha} + \frac{AB(L_1 + L_2 + L_{15} + L_{16})}{3CD\cos\alpha} + \frac{AB(L_3 + L_8 + L_{11} + L_{12})}{6CD\cos\alpha} + \frac{11AB(L_4 + L_7 + L_{10} + L_{13})}{24CD\cos\alpha} + \frac{AB(L_5 + L_6 + L_9 + L_{14})}{2CD\cos\alpha}.$$

In some embodiments, as for the method for improving the halo, if the overlapping area of the first pixel 11 and one of the at least two second pixels 21 corresponding to the first pixel 11 is less than a first threshold, the brightness coefficient of this second pixel 21 is 0. For example, the first threshold is any value between 1% and 10% of a pixel area of the one of the at least two second pixels 21. The first threshold is 1% of the pixel area of the one second pixel 21; the first threshold is 5% of the pixel area of the one second pixel 21; or the first threshold is 10% of the pixel area of the one second pixel 21.

The overlapping areas of one or some second pixels 21 and the first pixel 11 are less than the first threshold, and the first threshold is set to be small (for example, the first threshold is only 1% to 10% of the pixel area of one second pixel 21), which means that the overlapping areas of one or some second pixels 21 and the first pixel 11 are small. Therefore, the brightness coefficient of the second pixel 21 is small, so that the proportional brightness datum of the second pixel 21 is small, and the proportional brightness datum of the second pixel 21 has a little effect on the target brightness datum of the first pixel 11. Therefore, when the target brightness datum of the first pixel 11 is calculated, the second pixel 21 of which overlapping area with the first pixel 11 is less than the first threshold may be ignored. In this way, it is possible to reduce calculation amount of the target brightness datum of the first pixel 11, and simplify the calculation process, thereby increasing the processing speed o the display device.

For example, the first threshold is 10% of the pixel area of one second pixel 1. if the overlapping area of the first pixel and a certain second pixel 21 of the at least two, second pixels 21 corresponding to the first pixel 11 is less than 10% of the pixel area of the second pixel 21, the brightness coefficient of the second pixel 21 is equal to 0. For example, in the embodiments, the areas of the second peels $P_{01}$, $P_{02}$, $P_{03}$ and $P_{04}$ are all $$\frac{1}{12}AB,$$

less than 10% of the area AB of the second pixel 21. Therefore, the brightness coefficients of the second pixels $P_{01}$, $P_{02}$, $P_{03}$ and $P_{04}$ may not be acquired when the brightness coefficient of each of the at least two second pixels 21 corresponding to the first pixel 11 is acquired.

In some other embodiments, as for the method for improving the halo, if the overlapping area of one of the at least two second pixels 21 and the first pixel 11 is greater than a second threshold, the brightness coefficient of this second pixel 21 is a ratio of a whole area of the second pixel 21 to the area of the first pixel 11. For example, the second threshold is any value between 90% and 99% of the pixel area of the one of the at least two second pixels 21. The second threshold is 90% of the pixel area of the one second pixel 21; the second threshold is 95% of the pixel area of one second pixel 21; or the second threshold is 99% of the pixel area of the one second pixel 21.

The overlapping areas of one or some second pixels 21 and the first pixel 11 are greater than the second threshold, and the second threshold is set to be large (for example, the second threshold is between 90% to 99% of the pixel area of one second pixel 21), which means that the overlapping areas of one or some second pixels 21 and the first pixel 11 are large. Therefore, the brightness coefficient of the second pixel 21 is large, so that the proportional brightness datum of the second pixel 21 is large, and the proportional brightness datum of the second pixel 21 has a great influence on the target brightness datum of the first pixel 11. Therefore, when the target brightness datum of the first pixel 11 is calculated, the second pixel 21, of which overlapping area with the first pixel 11 is greater than the second threshold, can be calculated according to the ratio of the whole area of the second pixel 21 to the area of the first pixel 11. In this way, the calculation amount of the target brightness datum of the first pixel 11 is reduced, thereby increasing the processing speed of the display device.

For example, the second threshold is 90% of the pixel area of one second pixel 21. If the overlapping area of the first pixel 11 and a certain one of the at least two second pixels 21 corresponding to the first pixel 11 is greater than 90% of the pixel area of the one second pixel 21, the brightness coefficient of the second pixel 21 is the ratio of the area of the second pixel 21 to the area of the first pixel 11. For example, in the embodiments, the areas of the second pixels $P_4$, $P_7$, $P_{10}$ and $P_{13}$ are all $$\frac{11}{12}AB,$$

greater than 90% of the area AB of one second pixel 21. Therefore, the overlapping areas of the second pixels $P_4$, $P_7$, $P_{10}$ and $P_{13}$ and the first pixel 11 can be calculated directly according to AB, i.e., $S_7=S_8=S_{P4}=S_{P7}=S_{P10}=S_{P13}=S_{P5}=S_{P6}=S_{P9}=S_{P14}=AB$ when the brightness coefficient of each of the at least two second pixels 21 corresponding to the first pixel 11 is acquired.

In this way, according to the embodiments, it will be seen that the brightness coefficients of the second pixels $P_1$, $P_2$, $P_{15}$ and $P_{16}$ are all $$\frac{S_5}{S_3} = \frac{AB}{3CD\cos\alpha}.$$

The brightness coefficients of the second pixels $P_3$, $P_8$, $P_{11}$ and $P_{12}$ are all $$\frac{S_6}{S_3} = \frac{AB}{6CD\cos\alpha}.$$

The brightness coefficients of the second, pixels $P_4$, $P_5$, $P_6$, $P_7$, $P_9$, $P_{10}$, $P_{13}$ and $P_{14}$ are all $$\frac{S_7}{S_3} = \frac{AB}{2CD\cos\alpha}.$$

According to a correspondence table of the second gray-scale data and the second brightness data of the display sub-panel 2 to be mentioned below, the second brightness data of the second pixels $P_1, P_2, P_3, \ldots, P_{15}$ and $P_{16}$ are $L_1, L_2, L_3, \ldots, L_{15}$ and $L_{16}$, respectively. A calculation formula of the target brightness datum of the dimming sub-panel 1 is:

$$L_{sub} = \frac{S_5}{S_3}(L_1 + L_2 + L_{15} + L_{16}) + \frac{S_6}{S_3}(L_3 + L_8 + L_{11} + L_{12}) + \frac{S_7}{S_3}(L_4 + L_5 + L_6 + L_7 + L_9 + L_{10} + L_{13} + L_{14}). \quad (6)$$

In the formula (6), $L_{Sub}$ is the target brightness datum of the dimming sub-panel 1.

Since the data in the correspondence table, pre-stored in the display device, of the first gray-scale data and the first brightness data of the dimming sub-panel 1 are fixed values, it is likely that the target brightness datum $L_{Sub}$ of the dimming sub-panel 1 obtained according to the above formula (6) cannot be completely consistent with the first brightness data in the correspondence table. Therefore, the first brightness datum closest to the target brightness datum $L_{Sub}$ of the dimming sub-panel needs to be acquired from the correspondence table.

In some embodiments, as shown in FIG. 5, determining the first gray-scale datum of the first pixel 11 according to the target brightness datum includes step 310 (S310) and step 320 (S320).

In S310, the first brightness datum that has a minimum absolute value of a difference with the target brightness datum of the first pixel 11 is determined among a plurality of first brightness data of the first pixel 11.

In S320, the first gray-scale datum corresponding to the determined first brightness datum is acquired according to a correspondence between the first gray-scale data and the first brightness data of the dimming sub-panel 1, and the acquired first gray-scale datum is used as the first gray-scale datum of the first pixel 11.

Herein, the correspondence between the first gray-scale data and the first brightness data corresponding to the first gray-scale data of the dimming sub-panel 1 may be measured to obtain a Gamma curve of the dimming sub-panel 1.

For example, assuming that the number of gray scales that the dimming sub-panel 1 may display is 256, the correspondence between the first gray-scale data and the first brightness data of the dimming sub-panel 1 may be as shown in Table 2.

TABLE 2

| | First gray-scale datum | | | | | | |
|---|---|---|---|---|---|---|---|
| | 0 | 1 | 2 | 3 | 4 | ... | 254 | 255 |
| First brightness datum | 0.20 | 0.23 | 0.27 | 0.30 | 0.35 | ... | 266.4 | 266.8 |

In some embodiments, the correspondence between the first gray-scale data and the first brightness data of the dimming sub-panel 1 is data pre-stored in the display panel 3. In this way, in a process of performing S310 and S320, the pre-stored correspondence between the first gray-scale data and the first brightness data may be directly invoked to obtain a plurality of first brightness data of the first pixel 11, and then the first gray-scale datum corresponding to the first brightness datum of each first pixel 11 is acquired according to the first brightness datum of the first pixel 11, so as to increase the processing speed of the display device.

In some embodiments, if the first brightness data that have the minimum absolute value of the difference with the target brightness datum of the first pixel 11 among the first brightness data included in the correspondence between the first gray-scale data and the first brightness data of the dimming sub-panel 1 include two first brightness data, the first brightness datum is selected from the two first brightness data. For example, a larger first brightness datum is selected from the two first brightness data; alternatively, a smaller first brightness datum is selected from the two first brightness data.

For example, the target brightness data $L_{Sub}$ of the dimming sub-panel 1 is acquired according to the formula (6), and the first brightness datum $L_i$ closest to the target brightness datum $L_{Sub}$ of the dimming sub-panel 1 may be obtained according to $$\Delta L = \min_{1 \le i \le 256} |L_i - L_{Sub}|,$$

where $\Delta L$ is the minimum value among differences between $L_1$ to $L_{255}$ and $L_{Sub}$.

The first gray-scale datum corresponding to the first brightness datum that has the minimum difference with the target brightness datum $L_{Sub}$ of the dimming sub-panel 1 is the desired first gray-scale datum. It will be noted that if there are two first brightness data, i.e., $L_i$ and $L_{i+1}$ and absolute values of differences between the two first brightness data and $L_{Sub}$ are equal, one first brightness datum may be selected randomly from the two first brightness data.

For example, it may be defined that the smaller one of the two first brightness data is the first brightness datum closest to the target brightness datum $L_{Sub}$ of the dimming sub-panel 1. That is, the first brightness datum $L_i$ is selected as the first brightness datum closest to the target brightness datum $L_{Sub}$ of the dimming sub-panel 1, and the first gray-scale datum $G_i$ corresponding to the first brightness datum $L_i$ is selected as the desired first gray-scale datum.

Alternatively, it may be defined that the larger one of the two first brightness data is the first brightness datum closest to the target brightness datum $L_{Sub}$ of the dimming sub-panel 1. That is, the first brightness datum $L_{i+1}$ is selected as the first brightness datum closest to the target brightness datum $L_{Sub}$ of the dimming sub-panel 1, and the first gray-scale datum $G_{i+1}$ corresponding to the first brightness datum $L_{i+1}$ is selected as the desired first gray-scale datum.

It is worth mentioning that the shape of the first pixel 11 in the dimming sub-panel 1 in the embodiments is illustrated by taking the shape shown in FIG. 2A as an example, and the shape of the second pixel 21 in the display sub-panel 2 is illustrated by taking the shape shown in FIG. 2B as an example. However, the method for improving the halo is not limited thereto. As for the first pixels 11 with other shapes and the second pixels 21 with other shapes, the method for improving the halo is also applicable, and may also improve the halo problem of the display panel 3.

Figure 6:
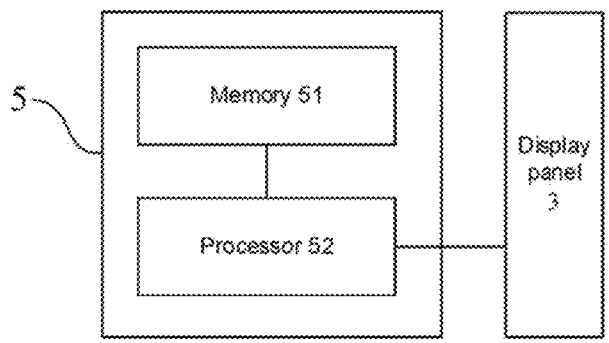
FIG. 6 is a schematic structural diagram of an apparatus for improving a halo, in accordance with some embodiments.

As shown in FIG. 6, some embodiments of the present disclosure provide an apparatus for improving a halo 5. and the apparatus for improving the halo 5 includes a processor 52 and a memory 51.

The processor 52 is electrically connected to the display panel 3.

The memory 51 has stored therein computer program instructions adapted to be executed by the processor 52, and when the computer program instructions are run on the processor 52, one or more steps in the method for improving the halo as described in any of the above embodiments are performed.

In this, way, the processor 52 first determines the target brightness datum of the first pixel 11, which is close to the second brightness datum of each second pixel 21, and then determines the first gray-scale datum of the first pixel 11 according to the target brightness datum of the first pixel 11. When the first gray-scale datum is used to drive the first pixel 11 to display a first gray scale, and when second gray-scale data are used to drive the at least two second pixels 21 corresponding to the first pixel 11 to display second gray scales, respectively, the target brightness datum corresponding to the first gray scale is relatively close to the second brightness datum corresponding to each second gray-scale datum as a whole. As a result the brightness of the first pixel 11 in the dimming sub-panel 1 is approximately the same as the brightness of the at least two second pixels 21 corresponding thereto, thereby improving the situation that the brightness of the second pixels 21 in the display sub-panel 2 is too dark or too bright, and achieving the purpose of improving the halo of the display panel 3.

The processor 52 may be a central processing unit (CPU), or may be any other general-purpose processor, a digital signal processor (DSP), an application-specific integrated circuit (ASIC), a field programmable gate array (FPGA) or any other programmable logic device, a discrete gate or transistor logic device, a discrete hardware component, etc. The general-purpose processor may be a microprocessor or any conventional processor.

The memory 51 is used to store program codes and data of the apparatus for improving the halo 5 provided by the embodiments of the present disclosure. The processor may achieve various functions of the apparatus for improving the halo 5 by running or executing software programs stored in the memory 51 and invoking the data stored in the memory 51.

The memory may be a read-only memory (ROM) or any other type of static storage device that may store static information and instructions, a random access memory (RAM) or any other type of dynamic storage device that may store information and instructions, an electrically erasable programmable read-only memory (EEPROM), a compact disc read-only memory (CD-ROM) or any other compact disc storage or optical disc storage (including a compressed disc, a laser disc, an optical disc, a digital versatile disc, a Blu-ray disc, etc.), a magnetic disc storage medium or any other magnetic storage device, or any other medium that may be used to carry or store a desired program code in the form of instructions or data structures and can be accessed by a computer, which is not limited thereto. The memory 51 may be separate and connected to the processor 52 via a communication bus. The memory 51 may also be integrated with the processor 52.

In some embodiments, the memory 51 has further stored therein at least one of the brightness coefficient datum of each of the at least two second pixels corresponding to each first pixel 11, data of the correspondence between the second gray-scale data and the second brightness data of the display sub-panel 2, and data of the correspondence between the first gray-scale data and the first brightness data of the dimming sub-panel 1. In this way, when the processor 52 achieves various functions of the apparatus for improving the halo 5, it is convenient for the processor 52 to invoke various data stored in the memory 51.

Figure 7:
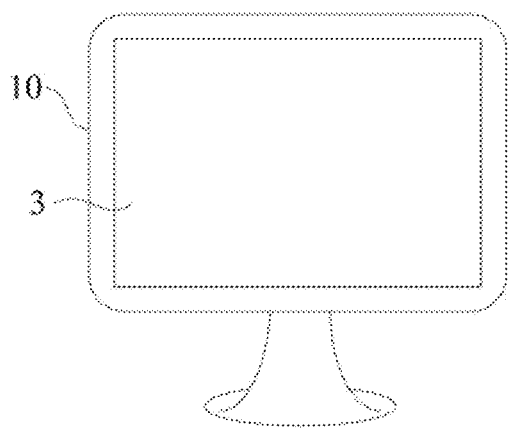
FIG. 7 is a schematic structural diagram of a display, in accordance with sore embodiments.

In some embodiments of the present disclosure, as shown in FIG. 7, a display 10 is also provided. The display 10 includes a display panel 3, and the apparatus for improving the halo 5 as described in some embodiments above, which is electrically connected to the display panel 3.

Herein, beneficial effects of the display 10 are the same as the beneficial effects of the apparatus 5 for improving the halo as described in some embodiments above, which will not be described herein again.

For example, the display 10 may be used as a display screen of any product with a display function, such as a mobile phone, a tablet computer, a television, a notebook computer, a digital photo frame, or a navigator.

Figure 8:
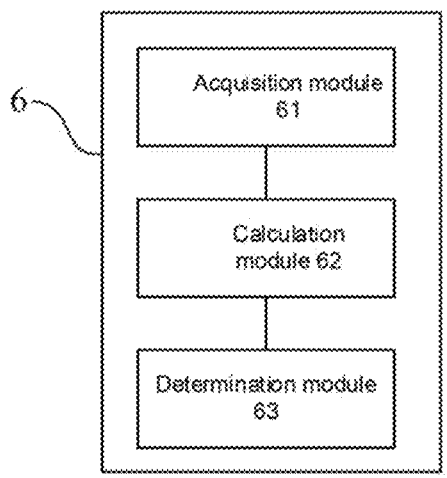
FIG. 8 is a schematic structural diagram of another apparatus for improving a halo, in accordance with some embodiments.

As shown in FIG. 8, some embodiments of the present disclosure provide an apparatus 6 for improving the halo, and referring to FIGS. 3A to 3D, it will be seen that the apparatus 6 for improving the halo is applied to the dual-cell display panel 3. The display panel 3 includes the dimming sub-panel 1 and the display sub-panel 2 that are superposed. The dimming sub-panel 1 includes a plurality of first pixels 11, the display sub-panel 2 includes a plurality of second pixels 21, and each first pixel 11 corresponds to at least two second pixels 21. The apparatus 6 for improving the halo includes an acquisition module 61, a calculation module 62 and a determination module 63.

The acquisition module 61 is configured to acquire the second brightness datum of each of the at least two second pixels 21 corresponding to the first pixel 11.

The calculation module 62 is configured to calculate the target brightness datum of the first pixel 11 according to the second brightness datum acquired by the acquisition module 61.

The determination module 63 is configured to determine the first gray-scale datum of the first pixel 11 according to the target brightness datum of the first pixel 11 calculated by the calculation module 62.

Based on this, in the embodiments of the present disclosure, the calculation module 62 calculates the target brightness datum of the first pixel 11, which is close to the second brightness datum of each second pixel 21, and then the determination module 63 determines the first gray-scale datum of the first pixel 11 according to the target brightness datum of the first pixel 11. In this way, when the first gray-scale datum is used to drive the first pixel 11 to present the first gray scale, and when second gray-scale data are used to drive the at least two second pixels 21 corresponding to the first pixel 11 to present the second gray scales, respectively, the target brightness datum corresponding to the first gray scale is relatively close to the second brightness data corresponding to respective second gray-scale data as a whole. As a result, the brightness of the first pixel 11 in the dimming sub-panel 1 is approximately the same as the brightness of the at least two second pixels 21 corresponding thereto, thereby improving the situation that the brightness of the second pixels 21 in the display sub-panel 2 is too dark or too bright, and achieving the purpose of improving the halo of the display panel 3.

The term "module" used in the above embodiments is used to denote a computer-related entity, hardware, firmware, a combination of hardware and software, software, or software in execution. For example, a module may be, but is not limited to, a process running on a processor, a processor, an object, an executable file, a thread of execution, a program, and/or a computer. Both the application running on the computing device and the computing device may be modules. One or more modules may reside within a process and/or thread of execution, and a module may be located on one computer and/or distributed between 2 or more computers. In addition, the modules may be executed by various computer-readable media to be mentioned below, which have stored a variety of data structures therein.

Some embodiments of the present disclosure provide a computer-readable storage medium (e.g. a non-transitory computer-readable storage medium). The computer-readable storage medium has stored therein computer program instructions that, when run on a processor, cause the processor to perform one or more steps of the method for improving halo as described in any of the above embodiments.

For example, the computer-readable storage medium may include, but is not limited to: a magnetic storage device (e.g., a hard disk, a floppy disk or a magnetic tape, etc.), an optical disk (e.g., a compact disk (CD), a digital versatile disk (DVD), etc.), a smart card or a flash memory device (e.g., an erasable programmable read-only memory (EPROM), a card, a stick or a key drive, etc.). The various computer-readable, storage media described in the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when run on a computer, cause the computer to perform one or more steps of the method for improving halo as described in the above embodiments.

Some embodiments of the present disclosure further provide a computer program. When run on a computer, the computer program causes the computer to perform one or more steps of the method for improving halo as described in the above embodiments.

Beneficial effects of the computer-readable storage media, the computer program product and the computer program are the same as the beneficial effects of the apparatus 5 for improving the halo as described in some embodiments, which will not be described herein again.

In the description of the above embodiments, specific features, structures, materials or characteristics may be combined in any suitable manner in any one or more embodiments or examples.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A method for improving a halo, applied to a display panel, the display panel including a dimming sub-panel and a display sub-panel that are superposed, the dimming sub-panel including a plurality of first pixels, the display sub-panel including a plurality of second pixels, each first pixel corresponding to at least two second pixels; and the method for improving the halo comprising: as for the first pixel:

acquiring a second brightness datum of each of the at least two second pixels corresponding to the first pixel;

calculating a target brightness datum of the first pixel according to second brightness data of the at least two second pixels; and determining a first gray-scale datum of the first pixel according to the target brightness datum.

2. The method for improving the halo according to claim 1, wherein calculating the target brightness datum of the first pixel according to the second brightness data of the at least two second pixels includes:

acquiring a brightness coefficient of each of the at least two second pixels, the brightness coefficient being a ratio of an overlapping area of the second pixel and the first pixel to an area of the first pixel;

obtaining a proportional brightness datum of each of the at least two second pixels by multiplying the brightness coefficient of the second pixel in the at least two second pixels by the second brightness datum of the second pixel; and obtaining the target brightness datum of the first pixel by summing the proportional brightness datum of each of the at least two second pixels.

3. The method for improving the halo according to claim 2, wherein if an overlapping area of one of the at least two second pixels and the first pixel is less than a first threshold, a brightness coefficient of the second pixel is 0.

4. The method for improving the halo according to claim 3, wherein the first threshold is any value between 1% and 10% of a pixel area of the one of the at least two second pixels.

5. The method for improving the halo according to claim 2, wherein if the overlapping area of one of the at least two second pixels and the first pixel is greater than a second threshold, a brightness coefficient of the second pixel is a ratio of a whole area of the second pixel to an area of the first pixel.

6. The method for improving the halo according to claim 5, wherein the second threshold is any value between 90% and 99% of a pixel area of the one of the at least two second pixels.

7. The method for improving the halo according to claim 2, wherein the brightness coefficient of each of the at least two second pixels is a datum pre-stored in the display panel.

8. The method for improving the halo according to claim 1, wherein acquiring the second brightness datum of each of the at least two second pixels corresponding to the first pixel includes:

acquiring a second gray-scale datum of the second pixel in the at least two second pixels corresponding to the first pixel; and acquiring the second brightness datum of the second pixel corresponding to the second gray-scale datum of the second pixel according to a correspondence between second gray-scale data and second brightness data of the display sub-panel.

9. The method for improving the halo according to claim 8, wherein the correspondence between the second gray-scale data and the second brightness data of the display sub-panel is data pre-stored in the display panel.

10. The method for improving the halo according to claim 1, wherein determining the first gray-scale datum of the first pixel according to the target brightness datum includes:

determining a first brightness datum that has a minimum absolute value of a difference with the target brightness datum of the first pixel among a plurality of first brightness data of the first pixel; and acquiring a first gray-scale datum corresponding to the first brightness datum according to a correspondence between first gray-scale data and first brightness data of the dimming sub-panel, the first gray-scale datum being used as the first gray-scale datum of the first pixel.

11. The method for improving the halo according to claim 10, wherein if there are two first brightness data that have the minimum absolute value of the difference with the target brightness datum of the first pixel among the plurality of first brightness data of the first pixel, one first brightness datum is selected from the two first brightness data.

12. The method for improving the halo according to claim 11, wherein selecting the one first brightness datum from the two first brightness data includes:
    selecting a larger first brightness datum from the two first brightness data; or
    selecting a smaller first brightness datum from the two first brightness data.

13. The method for improving the halo according to claim 10, wherein the correspondence between the first gray-scale data and the first brightness data of the dimming sub-panel is data pre-stored in the display panel.

14. An apparatus for improving a halo, the apparatus comprising a processor and a memory, wherein
    the memory stores computer program instructions adapted to be executed by the processor, and when the computer program instructions run on the processor, one or more steps of the method for improving the halo according to claim 1 are performed.

15. The apparatus for improving the halo according to claim 14, wherein the memory further stores at least one of a brightness coefficient datum of each of the at least two second pixels corresponding to each first pixel, data of correspondence between second gray-scale data and second brightness data of the display sub-panel, and data of correspondence between first gray-scale data and first brightness data of the dimming sub-panel.

16. A display, comprising: a display panel, and the apparatus for improving the halo according to claim 14 that is electrically connected to the display panel.

17. A non-transitory computer-readable storage medium storing computer program instructions that, when run on a processor, cause the processor to perform one or more steps of the method for improving the halo according to claim 1.

* * * * *